United States Patent [19]

Ferro

[11] Patent Number: 4,999,070

[45] Date of Patent: * Mar. 12, 1991

[54] NEW ARTICLES OF MANUFACTURE AND THEIR PRODUCTION

[75] Inventor: Gregory A. Ferro, Hoffman Estates, Ill.

[73] Assignee: Imi-Tech Corporation, Elk Grove Village, Ill.

[*] Notice: The portion of the term of this patent subsequent to Nov. 28, 2006 has been disclaimed.

[21] Appl. No.: 261,126

[22] Filed: Oct. 24, 1988

[51] Int. Cl.$^5$ ............................................... B32B 31/26
[52] U.S. Cl. ...................................... 156/85; 521/184; 521/185; 521/189; 521/918
[58] Field of Search ................ 521/184, 185, 189, 918

[56] References Cited

U.S. PATENT DOCUMENTS

| | | | |
|---|---|---|---|
| 3,726,834 | 4/1973 | Acle, Jr. | 260/47 |
| 4,070,312 | 1/1978 | Gagliani et al. | 260/2.5 |
| 4,319,000 | 3/1982 | Gagliani et al. | 521/189 |
| 4,433,068 | 2/1984 | Long et al. | 521/54 |
| 4,562,112 | 12/1985 | Lee et al. | 428/318 |
| 4,576,862 | 3/1986 | Lee et al. | 428/317.7 |
| 4,639,343 | 1/1987 | Long et al. | 264/45.5 |
| 4,708,972 | 11/1987 | Long et al. | 521/185 |
| 4,780,167 | 10/1988 | Hill | 521/185 X |

OTHER PUBLICATIONS

Gagliani, "Fire Resistant Resilient Foams", Final Report NAS 9-14718, Feb. 1986.

*Primary Examiner*—David A. Simmons
*Assistant Examiner*—James J. Engel, Jr.
*Attorney, Agent, or Firm*—John F. Sieberth

[57] ABSTRACT

By compressing and heat curing a non-resilient, non-flexible recurable material formed by subjecting cured polyimide foam to the action of pressurized steam, a wide variety of useful articles may be produced. These include tough, flame-resistant plastic films, sheets, panels, boards, and shapes in general; composites (both reinforced and unreinforced); and laminates and other articles in which separate shapes or parts are bonded together by a new type of tough, flame-resistant adhesive. Additionally, heretofore worthless products such as the kerf cut away from buns of polyimide foam during the foam manufacturing process can be converted and vastly upgraded into any of such an array of new articles of manufacture such as those just mentioned.

35 Claims, No Drawings

NEW ARTICLES OF MANUFACTURE AND THEIR PRODUCTION

TECHNICAL FIELD

This invention relates to new articles of manufacture and to new methods for the production of such articles, which articles include for example, tough, flame-resistant plastic films, sheets, panels, boards, and shapes in general; composites (both reinforced and unreinforced); and laminates and other articles in which separate shapes or parts are bonded together by a new type of tough, flame-resistant adhesive. Additionally, this invention relates to methods enabling heretofore worthless waste products to be converted and vastly upgraded into any of an array of new articles of manufacture such as those just mentioned.

BACKGROUND

In prior copending application Ser. No. 240,802 (Case IT-5826), filed Sept. 6, 1988, applicant describes the discovery that by exposing cured polyimide foam to an atmosphere of steam under appropriate time-temperature conditions a non-flexible, non-resilient recurable cellular material is formed.

THE INVENTION

This invention involves, inter alia, the discovery that by compressing and heat curing such recurable material (whether in cellular or essentially non-cellular form), it is possible to produce a virtually unlimited number of new and useful articles of manufacture, such as those referred to at the outset. Moreover the raw material used in making such recurable cellular material can be (but need not be) scrap or off-specification grade cured polyimide foam.

Accordingly this invention, in one of its basic forms, provides a process which comprises compressing and heat curing a non-resilient, non-flexible recurable material formed by subjecting cured polyimide foam to the action of pressurized steam. In the practice of a number of the embodiments of this invention the recurable material is preferably in subdivided or particulate form before it is compressed. In other embodiments the recurable material is in the form of a sheet or other shape appropriate for the use at hand.

To produce the recurable material in subdivided form the initial cured polyimide foam may be subdivided to the desired size (e.g., by shredding, chopping, etc.) and subjected to the action of pressurized steam, or alternatively, the cured polyimide foam may first be subjected to the action of the pressurized steam followed by subdividing the resultant recurable material to the desired size. Naturally, combinations of such procedures may also be employed, as, for example, subdividing the cured polyimide foam to an intermediate size, subjecting this to the action of pressurized steam, and thereafter further subdividing the resultant recurable material.

When the recurable material is in micro form (i.e., in the form of a very fine powder) it may no longer possess the cellularity, or at least the amount of cellularity, of the material from which it was produced. On the other hand, when the recurable material is macro form (i.e., in the form of sheets, blocks, discs, spheres, irregular chunks, and other non-finely divided pieces) it will usually possess cellularity and thus be a recurable cellular material.

When using the recurable material in subdivided or particulate form, it is desirable in the practice of certain embodiments of this invention to use the subdivided or particulate cellular material in admixture with a subdivided or particulate filler before subjecting the material to compression.

The process may be conducted such that the compressing and heat curing are conducted sequentially. Alternatively, the compressing and heat curing may be conducted concurrently. In the sequential mode of operation some heat may be applied even before the material is compressed, but the amount of thermal energy so applied is insufficient to cause the material to cure to any substantial extent.

Preferably the cured polyimide foam from which the recurable material is or was formed, is or was a polyimide of (a) at least one aromatic tetracarboxylic acid or derivative thereof and (b) at least one aromatic or heterocyclic primary diamine, or combination thereof. Particularly preferred raw materials for use in the process are cured polyimide foams composed predominantly of a polyimide made from 3,3',4,4'-benzophenone tetracarboxylic acid lower alkyl ester (most preferably methyl or ethyl esters), 4,4'-methylenedianiline and a diaminopyridine (most preferably, 2,6-diaminopyridine). It will be understood and appreciated however that any of a wide variety of cured polyimide foams may be use as raw materials in the process, and moreover that in the embodiments in which the raw material is used in subdivided or particulate form (small chunks, shreds, or etc.), the raw material may be comprise scrap polyimide foam such as the kerf which is normally cut away from the cured polyimide buns in the course of the manufacturing process.

The amount of pressure used in compressing the recurable material will largely be dependent upon the type of article being produced and the properties (e.g., density) desired therefor. Thus high pressures such as attainable by use of a mechanical or hydraulic presses can yield films or sheets or other shapes having little or no residual cellular configuration. On the other hand, when it is desired to provide boards, panels or other shapes which have residual cellularity, lesser pressures will be employed.

Temperatures used in the heat curing will vary somewhat depending upon the makeup of the raw materials being processed, the amount and character of the filler or reinforcement used, if any, and the like. Generally speaking temperatures above about 200° C. (usually above about 250° C.) are normally adequate.

This invention is not intended to be, nor should it be, limited to any specific set of time-temperature-pressure conditions for the compression and heat curing operations of this invention, as these may be varied to suit the needs of the occasion and can be readily ascertained in any given case by performing a few pilot experiments with the particular material(s) being processed. All that is required is that the results achievable by the practice of this invention be accomplished by use of appropriate materials and process conditions.

In order to appreciate some of the embodiments of this invention, a listing of some of these embodiments is presented below. In this listing the term "steam foam" is used as an abbreviated way of referring to the hydrolytic steaming process which converts cured polyimide foam into the non-resilient, non-flexible recurable material. Also in the interest of brevity such non-resilient, non-flexible recurable material is referred to simply as "material". When the context indicates that the material contains or has had filler mixed therein, or that it has been subdivided, or etc., the term "material" should be understood as referring to the material in that particular condition. Again for the sake of brevity the terms "filler" and "filled" are used, but it is to be understood that the fillers may be or include reinforcing materials, such as continuous, interwoven or chopped fibers or rovings, particulate or powdery material, platelets, hollow spherical articles or microballoons, etc. The term "subdivide" encompasses such operations as crushing, shredding, chopping, grinding, abrading, etc., and thus "subdivided" refers to materials in forms resulting from the use of such procedures. The terms "coat" and "laminate" are used in their normal sense to refer to applying a coating of material (which may be subdivided or in any other suitable form), or a laminate of material (usually in sheet or film form) to another object or substrate. The term "interpose" denotes applying the material to one or more articles or substrates so that in the article to be compressed and cured the material is between or among the articles. Thus the material may first be applied to (e.g., coated onto a surface of), say, one article and another article placed thereon so that the material is (in this case) between two articles and thus may serve as an adhesive layer therefor. Alternatively, this same end product may be achieved for example by holding the two articles in close proximity to each other and sliding or otherwise introducing the material between these two articles, or by coating the surfaces of the two articles with the material and then bringing the two coated faces together. The terms "coat", "laminate", and "interpose" thus overlap each other to some extent, and are intended to include forming impregnated articles (prepregs, etc.), forming coated articles, forming laminated articles, forming sandwich structures, forming articles in which two or more parts are bonded or adhered together, forming reinforced articles, etc.

The listing is as follows:

General embodiments, e.g., applicable for making films, sheets, boards, shapes, laminates, composites, coated articles, sandwich structures; and for bonding materials or articles together as in the case of adhesive applications (1) Compress & heat cure material
(2) Compress & heat cure subdivided material
(3) Compress & heat cure material in sheet form
(4) Compress & heat cure filled material
(5) Compress & heat cure subdivided filled material
(6) Compress & heat cure filled material in sheet form
(7) Subdivide, compress & heat cure material
(8) Subdivide, compress & heat cure filled material
(9) Subdivide, mix filler with, compress & heat cure material
(10) Subdivide, mix more filler with, compress & heat cure filled material
(11) Mix filler with subdivided material, compress & heat cure
(12) Mix more filler with subdivided filled material, compress & heat cure
(13) Conduct 1–12 respectively, with compressing and heat curing of the material done concurrently
(14) Conduct 1–12 respectively, with compressing and heat curing of the material done sequentially
(15) Steam foam; compress & heat cure the material
(16) Steam subdivided foam; compress & heat cure the material
(17) Steam foam in sheet form; compress & heat cure the material
(18) Steam filled foam; compress & heat cure the material
(19) Steam subdivided filled foam; compress & heat cure the material
(20) Steam filled foam in sheet form; compress & heat cure the material
(21) Steam foam; subdivide, compress & heat cure the material
(22) Steam filled foam; subdivide, compress & heat cure the material
(23) Steam foam; subdivide, mix filler with, compress & heat cure the material
(24) Steam filled foam; subdivide, mix more filler with, compress & heat cure the material
(25) Subdivide & steam foam; compress & heat cure the material
(26) Subdivide & steam filled foam; compress & heat cure the material
(27) Subdivide & steam foam; mix filler with, compress & heat cure the material
(28) Subdivide & steam filled foam; mix more filler with, compress & heat cure the material
(29) Subdivide, mix filler with, & steam foam; compress & heat cure the material
(30) Subdivide filled foam, mix more filler with, & steam the foam; compress & heat cure the material
(31) Conduct 15–30 respectively, with compressing and heat curing of the material done concurrently
(32) Conduit 15–30 respectively, with compressing and heat curing of the material done sequentially Embodiments relating more particularly to formation of coated or laminated articles, sandwich structures, composites, and the like

(33) Compress & heat cure a coating or lamination of material on a substrate
(34) Compress & heat cure a coating or lamination of subdivided material on a substrate
(35) Compress & heat cure a coating or lamination of material in sheet form on a substrate
(36) Compress & heat cure a coating or lamination of filled material on a substrate
(37) Compress & heat cure a coating or lamination of subdivided filled material on a substrate
(38) Compress & heat cure a coating or lamination of filled material in sheet form on a substrate
(39) Coat or laminate a substrate with material, & compress & heat cure the material thereon
(40) Coat or laminate a substrate with subdivided material, & compress & heat cure the material thereon
(41) Coat or laminate a substrate with material in sheet form, & compress & heat cure the material thereon
(42) Coat or laminate a substrate with filled material, & compress & heat cure the material thereon
(43) Coat or laminate a substrate with subdivided filled material, & compress & heat cure the material thereon
(44) Coat or laminate a substrate with filled material in sheet form, & compress & heat cure the material thereon
(45) Subdivide material, coat or laminate a substrate therewith, & compress & heat cure the material thereon

(46) Subdivide filled material, coat or laminate a substrate therewith, & compress & heat cure the material thereon
(47) Subdivide material, mix filler therewith, coat or laminate a substrate therewith, & compress & heat cure the material thereon
(48) Subdivide filled material, mix more filler therewith, coat or laminate a substrate therewith, & compress & heat cure the material thereon
(49) Mix filler with subdivided material, coat or laminate a substrate therewith, & compress & heat cure the material thereon
(50) Mix more filler with subdivided filled material, coat or laminate a substrate therewith, & compress & heat cure the material thereon
(51) Conduct 33-50 respectively, with compressing and heat curing of the material done concurrently
(52) Conduct 33-50 respectively, with compressing and heat curing of the material done sequentially
(53) Steam foam; coat or laminate a substrate with the material, & compress & heat cure the material thereon
(54) Steam subdivided foam; coat or laminate a substrate with the material, & compress & heat cure the material thereon
(55) Steam foam in sheet form; coat or laminate a substrate with the material, & compress & heat cure the material thereon
(56) Steam filled foam; coat or laminate a substrate with the material, & compress & heat cure the material thereon
(57) Steam subdivided filled foam; coat or laminate a substrate with the material, & compress & heat cure the material thereon
(58) Steam filled foam in sheet form; coat or laminate a substrate with the material, & compress & heat cure the material thereon
(59) Steam foam; subdivide the material, coat or laminate a substrate therewith, & compress & heat cure the material thereon
(60) Steam filled foam; subdivide the material, coat or laminate a substrate therewith, & compress & heat cure the material thereon
(61) Steam foam; subdivide & mix filler with the material, coat or laminate a substrate therewith, & compress & heat cure the material thereon
(62) Steam filled foam; subdivide & mix more filler with the material, coat or laminate a substrate therewith, & compress & heat cure the material thereon
(63) Subdivide & steam foam; coat or laminate a substrate with the material, & compress & heat cure the material thereon
(64) Subdivide & steam filled foam; coat or laminate a substrate with the material, & compress & heat cure the material thereon
(65) Subdivide & steam foam; mix filler with the material, coat or laminate a substrate therewith, & compress & heat cure the material thereon
(66) Subdivide & steam filled foam; mix more filler with the material, coat or laminate a substrate therewith, & compress & heat cure the material thereon
(67) Subdivide, mix filler with, & steam foam; coat or laminate a substrate with the material, & compress & heat cure the material thereon
(68) Subdivide filled foam, mix more filler with, & steam the foam; coat or laminate a substrate with the material, & compress & heat cure the material thereon
(69) Conduct 53-68 respectively, with compressing and heat curing of the material done concurrently
(70) Conduct 53-68 respectively, with compressing and heat curing of the material done sequentially Embodiments relating more particularly to formation of adhesively bonded articles, laminates, sandwich structures, composites, and the like

(71) Compress & heat cure material interposed between or among a plurality of articles
(72) Compress & heat cure subdivided material interposed between or among a plurality of articles
(73) Compress & heat cure material in sheet form interposed between or among a plurality of articles
(74) Compress & heat cure filled material interposed between or among a plurality of articles
(75) Compress & heat cure subdivided filled material interposed between or among a plurality of articles
(76) Compress & heat cure filled material in sheet form interposed between or among a plurality of articles
(77) Interpose material between or among a plurality of articles, & compress & heat cure the material therebetween or thereamong
(78) Interpose subdivided material between or among a plurality of articles, & compress & heat cure the material therebetween or thereamong
(79) Interpose material in sheet form between or among a plurality of articles, & compress & heat cure the material therebetween or thereamong
(80) Interpose filled material between or among a plurality of articles, & compress & heat cure the material therebetween or thereamong
(81) Interpose subdivided filled material between or among a plurality of articles, & compress & heat cure the material therebetween or thereamong
(82) Interpose filled material in sheet form between or among a plurality of articles, & compress & heat cure the material therebetween or thereamong
(83) Subdivide material, interpose the material between or among a plurality of articles, & compress & heat cure the material therebetween or thereamong
(84) Subdivide filled material, interpose the material between or among a plurality of articles, & compress & heat cure the material therebetween or thereamong
(85) Subdivide material, mix filler therewith, interpose the material between or among a plurality of articles, & compress & heat cure the material therebetween or thereamong
(86) Subdivide filled material, mix more filler therewith, interpose the material between or among a plurality of articles, & compress & heat cure the material therebetween or thereamong
(87) Mix filler with subdivided material, interpose the material between or among a plurality of articles, & compress & heat cure the material therebetween or thereamong
(88) Mix more filler with subdivided filled material, interpose the material between or among a plurality of articles, & compress & heat cure the material therebetween or thereamong
(89) Conduct 71-88 respectively, with compressing and heat curing of the material done concurrently
(90) Conduct 71-88 respectively, with compressing and heat curing of the material done sequentially

(91) Steam foam; interpose the material between or among a plurality of articles, & compress & heat cure the material therebetween or thereamong

(92) Steam subdivided foam; interpose the material between or among a plurality of articles, & compress & heat cure the material therebetween or thereamong

(93) Steam foam in sheet form; interpose the material between or among a plurality of articles, & compress & heat cure the material therebetween or thereamong

(94) Steam filled foam; interpose the material between or among a plurality of articles, & compress & heat cure the material therebetween or thereamong

(95) Steam subdivided filled foam; interpose the material between or among a plurality of articles, & compress & heat cure the material therebetween or thereamong

(96) Steam filled foam in sheet form; interpose the material between or among a plurality of articles, & compress & heat cure the material therebetween or thereamong

(97) Steam foam; subdivide the material, interpose the material between or among a plurality of articles, & compress & heat cure the material therebetween or thereamong

(98) Steam filled foam; subdivide the material, interpose the material between or among a plurality of articles, & compress & heat cure the material therebetween or thereamong

(99) Steam foam; subdivide & mix filler with the material, interpose the material between or among a plurality of articles, & compress & heat cure the material therebetween or thereamong (100) Steam filled foam; subdivide & mix more filler with the material, interpose the material between or among a plurality of articles, & compress & heat cure the material therebetween or thereamong (101) Subdivide & steam foam; interpose the material between or among a plurality of articles, & compress & heat cure the material therebetween or thereamong (102) Subdivide & steam filled foam; interpose the material between or among a plurality of articles, & compress & heat cure the material therebetween or thereamong (103) Subdivide & steam foam; mix filler with the material, interpose the material between or among a plurality of articles, & compress & heat cure the material therebetween or thereamong (104) Subdivide & steam filled foam; mix more filler with the material, interpose the material between or among a plurality of articles, & compress & heat cure the material therebetween or thereamong (105) Subdivide, mix filler with, & steam foam; interpose the material between or among a plurality of articles, & compress & heat cure the material therebetween or thereamong (106) Subdivide filled foam, mix more filler with, & steam the foam; interpose the material between or among a plurality of articles, & compress & heat cure the material therebetween or thereamong (107) Conduct 91–106 respectively, with compressing and heat curing of the material done concurrently (108) Conduct 91–106 respectively, with compressing and heat curing of the material done sequentially To produce the recurable material, cured polyimide foam (whether in subdivided form or sheet or slab form) is exposed to pressurized steam under time-temperature-pressure conditions yielding a recurable material that is malleable and readily shaped into various configurations. While in this condition it may be subdivided if desired. The recurable material in cellular form (e.g., as a cellular sheet) is well-suited for use as a bonding layer for producing laminated composites and panels, and/or as an outer sound or vibration absorbing coating for various planar substrates.

As noted above, a feature of this invention is that the initial cured polyimide foam may be scrap or off-specification material which would otherwise have to be disposed of. The scrap or off-specification material may be used by itself or used in combination with specification grade cured polyimide foam.

In conducting the pressurized steam hydrolysis, it is convenient to subject the initial polyimide foam material to the action of steam in a closed system such as an autoclave. The conditions to be used may vary from one type of polyimide foam to another. With polyimide foams of the type described in the examples hereinafter, temperatures in the range of about 260° to about 274° C. (pressures in the range of about 680 to about 849 psia) will ordinarily be employed. Times in the order of 2 to 4 hours are generally sufficient, but other time periods may be found suitable for the purposes at hand. The only requirement is that with the given polyimide foam starting material(s) being used the time-temperature-pressure conditions should be selected such that a non-resilient, non-flexible recurable material is formed.

Among the fillers and reinforcing materials that may be utilized are metals, minerals, polymers and ceramics in powder or particulate form, or in such forms as turnings, platelets, irregular shapes, short fibers, filaments or strands, continuous or woven fibers or strands or rovings, and the like. Laminating materials and substrates for use with the recurable materials in the practice of this invention include sheets, plies, boards, films, foils, fabrics, prepregs, aligned fibers or strands or rovings, or other shapes of metals, plastics, ceramics, composite materials, particle board, wood, paper, paperboard, rubbers and elastomers, and many other such materials. It will be recognized that multilayered and/or composite structures or panels may be used as substrates or laminates. The possibilities are virtually limitless.

Having described the basic concepts of the invention, reference is now made to the following examples which are provided by way of illustration, but not by way of limitation of the practice of the invention.

Examples I through III illustrate methods of forming the non-flexible, non-resilient recurable material, and also illustrate how such material may be heat cured.

Example I

The samples used in these runs were based on cured polyimide foams made from a lower alkyl ester of benzophenone tetracarboxylic acid (predominantly dimethyl ester), 4,4'-methylenedianiline and 2,6-diaminopyridine in a mol ratio of about 1.0:0.7:0.3, respectively. Six such samples were placed in a sealed autoclave and subjected to steam at 270° F. (about 132 C.) for 4 hours. After each hour, the glass transition temperature (Tg) of the foam was determined by differential scanning calorimetry with a Mettler TA-3000 System with a TC. 10A Processor, using the 50% Tg values reported by the system. After the third hour, and again at the end of the fourth hour, separate portions of these six foams were removed from the autoclave and recured in a thermal oven at 525 F. (about 274° C.) for 45 minutes. The tensile properties of the resultant cured foams were then determined by ASTM test procedure D-3574 using an Instrom model 1122 universal tester with a 50-pound load cell.

Table 1 shows the Tg values for the initial polyimide foam samples, the Tg values of these materials after 1, 2, 3, and 4 hours of exposure to the pressurized steam, and the Tg values of the foams that were recured after 3 and 4 hours of steam exposure, respectively. The results of the tensile strength measurements are shown in Table 2.

TABLE 1

| | Glass Transition Temperatures, °C. | | | | | | |
|---|---|---|---|---|---|---|---|
| Sample | Before Autoclave | Autoclave 1 Hour | Autoclave 2 Hours | Autoclave 3 Hours | Autoclave 4 Hours | Recured | Recured |
| 1 | 268.9 | 264.0 | 260.9 | 258.8 | 260.1 | 286.7 | 286.3 |
| 2 | 273.4 | 267.5 | 262.8 | 262.4 | 256.2 | 286.1 | 283.6 |
| 3 | 273.0 | 265.2 | 261.7 | 260.6 | 260.1 | 286.5 | 285.5 |
| 4 | 270.3 | 268.4 | 268.1 | 262.2 | 260.0 | 286.3 | 285.6 |
| 5 | 269.3 | 265.4 | 265.3 | 265.0 | 253.7 | 284.9 | 287.4 |
| 6 | 272.8 | 266.6 | 263.4 | 262.9 | 255.3 | 286.7 | 284.9 |

TABLE 2

| | Tensile Strength, (psi) | |
|---|---|---|
| Sample | Recured After 3 Hours Autoclave | Recured After 4 Hours Autoclave |
| 1 | 11.7 | 8.4 |
| 2 | 11.7 | 11.5 |
| 3 | 12.3 | 10.4 |
| 4 | 12.1 | <1.0 |
| 5 | 12.6 | 7.7 |
| 6 | 11.5 | <1.0 |

The data in Table 2 indicate that under the conditions used, all six recured samples that had been steam treated for 3 hours exhibited tensile strength properties similar to the tensile strength properties of the original cured polyimide foams. On the other hand, although all of the six samples that had been steamed treated for 4 hours were recurable, only recured Samples 2 and 3 retained tensile properties similar to the initial foams from which they were formed. Recured Samples 1 and 5 had lower tensile strengths and the tensile strengths of Samples 4 and 6 were very low.

EXAMPLE II

A series of runs were conducted generally as in Example I except that the samples were exposed to pressurized steam in the autoclave for a total of 6 hours, and tensile strength measurements were made on all samples. The initial cured polyimide foam had a Tg of 275.36 C. and a tensile strength of 9.08+0.40 psi. When this foam was subjected to the recuring conditions (without having been exposed to steam) it had a Tg of 280.43° C. and a tensile strength of 8.91+1.07 psi. The results of the runs involving use of the steam treatment are summarized in Table 3.

TABLE 3

| | Glass Transition Temperatures, °C. | | | Tensile Strength, psi | |
|---|---|---|---|---|---|
| Sample | Initial | After Autoclave | After Recuring | After Autoclave | After Recuring |
| 1 Hr. | 275.19 | 271.95 | 284.80 | 9.84 + 1.66 | 10.16 + 1.55 |

TABLE 3-continued

| | Glass Transition Temperatures, °C. | | | Tensile Strength, psi | |
|---|---|---|---|---|---|
| Sample | Initial | After Autoclave | After Recuring | After Autoclave | After Recuring |
| 2 Hrs. | 276.33 | 268.24 | 280.74 | 7.26 + 1.35 | 8.88 + 0.64 |
| 3 Hrs. | 274.92 | 265.20 | 277.81 | 6.13 + 1.02 | 7.23 + 0.61 |
| 4 Hrs. | 274.15 | 261.86 | 280.36 | <1.0 | 9.15 + 0.55 |
| 5 Hrs. | 279.40 | 263.27 | 281.29 | <1.0 | 11.09 + 0.80 |
| 6 Hrs. | 276.04 | 273.66 | 286.46 | <1.0 | <1.0 |

EXAMPLE III

Using the general procedure of Example II, six samples (12"× 6"×0.5" in size) of the cured polyimide foam were subjected to pressurize steam in the autoclave. After specified times of steam-treatment, the samples together with a controls ample (not steam treated) were subjected to recuring conditions, and Tg and tensile strength measures were made on all samples. Tables 4 and 5 summarize the results so obtained.

TABLE 4

| | Glass Transition Temperatures, °C. | | | | | | |
|---|---|---|---|---|---|---|---|
| | Before Autoclave | After Autoclave | | | | | |
| | | 1 Hr. | 2 Hrs. | 3 Hrs. | 4 Hrs. | 5 Hrs. | 6 Hrs. |
| Control | 275.4 | | | | | | |
| 1 | 275.2 | 271.9 | | | | | |
| 2 | 276.3 | | 268.2 | | | | |
| 3 | 274.9 | | | 265.2 | | | |
| 4 | 274.2 | | | | 261.9 | | |
| 5 | 279.4 | | | | | 263.3 | |
| 6 | 276.0 | | | | | | 273.7 |
| | After Thermal Recure | | | | | | |
| | | 1 Hr. | 2 Hrs. | 3 Hrs. | 4 Hrs. | 5 Hrs. | 6 Hrs. |
| Control | 280.4 | | | | | | |
| 1 | | 284.8 | | | | | |
| 2 | | | 280.7 | | | | |
| 3 | | | | 277.8 | | | |
| 4 | | | | | 280.4 | | |
| 5 | | | | | | 281.3 | |
| 6 | | | | | | | 286.5 |

TABLE 5

| | Tensile Strength, (psi) | | | | | | |
|---|---|---|---|---|---|---|---|
| Sample | Before Autoclave | After Autoclave | | | | | |
| | | 1 Hr. | 2 Hrs. | 3 Hrs. | 4 Hrs. | 5 Hrs. | 6 Hrs. |
| Control | 9.1 | | | | | | |
| 1 | | 9.8 | | | | | |
| 2 | | | 7.3 | | | | |
| 3 | | | | 6.2 | | | |
| 4 | | | | | <1.0 | | |
| 5 | | | | | | <1.0 | |

TABLE 5-continued

| | Tensile Strength, (psi) | | | | | |
|---|---|---|---|---|---|---|
| 6 | | | | | | <1.0 |
| | After Thermal Recuring | | | | | |
| | 1 Hr. | 2 Hrs. | 3 Hrs. | 4 Hrs. | 5 Hrs. | 6 Hrs. |
| Control | 9.0 | | | | | |
| 1 | | 10.2 | | | | |
| 2 | | | 8.9 | | | |
| 3 | | | | 7.2 | | |
| 4 | | | | | 9.2 | |
| 5 | | | | | | 11.1 |
| 6 | | | | | | <1.0 |

Examples IV and V illustrate the production and properties of a variety of articles of this invention.

EXAMPLE IV

The recurable material used in forming these articles was produced as follows: Pieces of cured polyimide foam roughly 12 inches × 12 inches × ½ inch in size were cut from larger sheets, including kerf, taken from a waste pile of cured polyimide foam. This foam had been produced from a precursor composed predominantly of 3,3',4,4'-benzophenone tetracarboxylic acid dimethyl ester, 4,4'-methylenedianiline and 2,6-diaminopyridine (mol ratio of 1.0:0.7:0.3, respectively). Areas of crust were left on some of the pieces. These pieces were exposed to steam at 270° F. (about 132° C.) for 3.5 hours. The resultant cellular material was easily crushed by hand into a fine, low bulk density powder.

A group of articles was formed from this powder as follows:

(a) A mixture composed of 50% by weight of the above recurable powder and 50% by weight of HI-YIELD vermiculite particles was prepared by rolling these materials in a closed jug. The resultant mixture was pressed by hand into a rectangular pan. The pan was placed in a thermal oven for one hour at 554° F. (290° C.) for one hour and then an additional one half hour at 600° F. (about 316 C.). The article formed was a brown, boardy, composite type material with a density of 5.3 lbs/cubic foot. The product had good integrity and was quite rigid, compressing only slightly with finger pressure and snapping after only slight flex. The composite material did not burn when exposed to the flame from a propane torch; instead it charred and cracked.

(b) Portions of the above recurable powder were placed on both sides of a perforated aluminum plate (⅛ inch holes) and between two solid metal plates. The outer plates were compressed together by screwing down wing nuts at the corners. This assembly was heated treated as in (a) above. The perforated plate with the cured particulate matter on both sides was then removed from between the compression plates. This yielded a coated aluminum plate in which the foam particles appeared to have melted together to form a smooth surface but with discrete particles beneath the surface. This coating could not be readily scratched away from the aluminum substrate.

(c) A portion of the above recurable powder was placed between compression plates which were screwed together as tight as possible by means of wing nuts at the corners. The assembly was heat treated as in (a). The cured material was removed from between the plates after cooling. The resultant product was a thin, wafer-like material that could be flexed to about 20° before cracking. The surface was smooth and glossy but the interior as still in the form of a dense foam. The density of the wafer-like material was 12.8 lbs/cubic foot. It did not burn when exposed to a gas flame; instead it merely charred to a limited extent.

(d) Another portion of the above recurable particulate material was placed between the platens of a hydraulic press. The press was closed to a pressure of 750 psi with platen temperatures of 550° F. (about 288° C.). The press was opened after about one minute. The resultant article was a thin, flexible, translucent, amber colored, strong, plastic-like sheet. It softened and buckled when exposed to a gas flame but it did not burn.

EXAMPLE V

Some waste foam of the type used in Example IV was shredded and then subjected to pressurized steam in an autoclave as in Example IV. The steam treated shreds were pressed together by hand into a pan of rectangular shape constituting a mold therefor. The pan was placed in a thermal oven and heated first for 0.5 hour at 500° F. (260° C.), then for 0.5 hour at 554° F. (290° C.) and finally for 0.5 hour at 600° F. (about 316° C.). This produced a rigid, dark brown cured cellular foam having a density of 6.7 lbs/cubic foot. The product was strong, only slightly compressible, and was flexible. It did not burn when exposed to a gas flame.

The initial cured polyimide foams used in the practice or this invention can vary widely in composition. In general, they are produced from polyimide precursors composed of a mixture comprising at least (i) one or more organic tetracarboxylic acids or derivatives thereof, and (ii) one or more organic diamines co reactive therewith, preferably including at least an aromatic or heterocyclic primary diamine. Components (i) and (ii) are usually present in the mixture in essentially stoichiometric quantities.

The organic tetracarboxylic acids or derivatives thereof are preferably based on aromatic tetracarboxylic acids having the general formula:

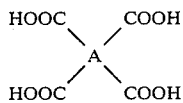

wherein A is a tetravalent organic group preferably an aromatic group. The tetravalent organic group A is most preferably an aromatic group having one of the following structures:

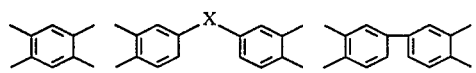

wherein X is one or more of the following:

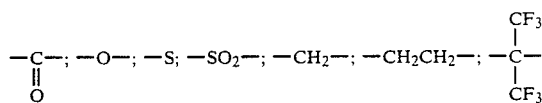

although other aromatic groups are suitable. The derivatives which may be employed include acid halides, acid salts, esters, and the like. Of these, esters are preferred and are most generally used for foam production.

The derivatives which may be employed include acid halides, acid salts, esters, and the like. Of these, esters are preferred and are most generally used for foam production.

Preferred among the tetracarboxylic acid esters are the alkyl esters of 3,3′,4,4′-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. Nos. 4,161,477, 4,183,838 and 4,183,839, the disclosures of which are incorporated herein by reference. As described in those patents, bis-imide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The tetracarboxylic acid derivative used in the manufacture of the initial polyimide foams employed in the practice of this invention may also be an N-substituted imido acid ester of the tetracarboxylic acid as taught by U.S. Pat. Nos. 4,647,597 and 4,656,198, the disclosures of which are incorporated herein by reference. As described in those patents, the N-substituted imido acid ester may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula:

H₂N—R′—NH₂ wherein R′ is an aromatic group containing 5 to 16 carbon atoms and containing up to one hetero atom in the ring, the hetero atom being nitrogen, oxygen or sulfur. Also included are aromatic groups such as:

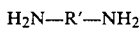

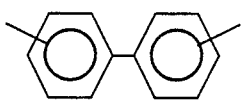

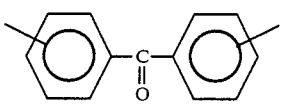

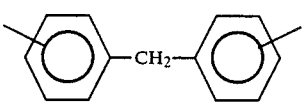

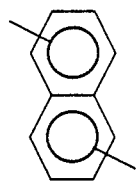

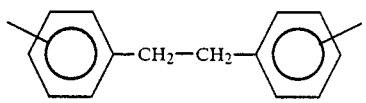

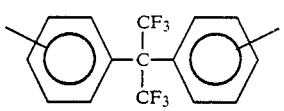

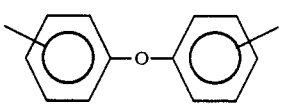

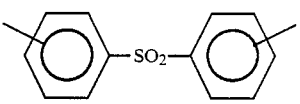

Representatives of such diamines include:
2,6-diaminopyridine;
3,5-diaminopyridine;
3,3′-diaminodiphenylsulfone;
4,4′-diaminodiphenylsulfone;
4,4′-diaminodiphenylsulfide;
3,3′-diaminodiphenylether;
4,4′-diaminodiphenylether;
meta-phenylenediamine;
para-phenylenediamine;
4,4′-methylene dianiline;
2,6-diamino toluene;
2,4- diamino toluene; and the like.

It is also possible and sometimes desirable in the preparation of the polyimide precursors, to include in the reaction mixture one or more aliphatic diamines. Such aliphatic diamines are preferably alpha-omega diaminoalkanes having the formula:

$$H_2N-(CH_2)_n-NH_2 \qquad (I)$$

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic etherified polyamines of the type polyoxypropylene amines having the formula:

$$H_2N-CH(CH_3)CH_2-[OCH_2CH(CH_3)]_x-NH_2 \qquad (II)$$

wherein x varies from 1 to about 5 carbon atoms.

Other useful primary diamines which may be included in the foams used in the practice of this invention include aminoterminated butadiene-nitrile copolymers having the general formula:

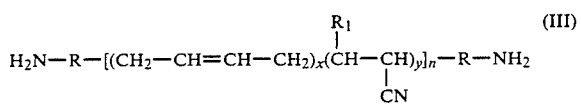

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamines which may be included in the polyimide foams used in this invention is the aromatic amino-terminated silicones, such as those having the general formula:

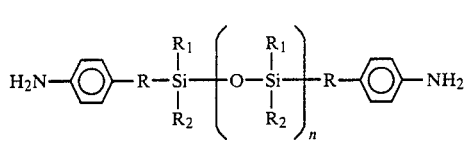

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams for use in this invention are the diesters of an amino-substituted aromatic carboxylic acid and a polymethylene glycol. Such diesters may be represented by the general formula:

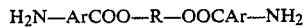

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoic acid.

In producing the initial polyimide foams, the organic tetracarboxylic acid preferably in the form of its diester, most preferably from methanol or ethanol, is reacted with the above-referred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the polyimide and polymers can be varied. In general, it is preferred to employ essentially stoichiometric proportions as between the mixture of tetracarboxylic acids or derivatives thereof and the primary diamine(s). However, non-stoichiometric mixtures can be used although the excess of the reactant present in excess usually does not participate in the reaction.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen OT, Celogen AZ 130, Celogen RA, Celogen HT 500, Celogen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the blowing agents identified by trade name above follow:

| Blowing Agent | Chemical Composition |
| --- | --- |
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in forming polyimide foams suitable for use in the practice of this invention.

The initial foams may contain various filler and/or reinforcing materials. For example, graphite, glass and other synthetic fibers can be added to the precursor composition to produce a fiber-reinforced product. Microballons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

When producing foams from tetracarboxylic acids or derivatives thereof other than lower alkyl esters, a blowing agent and/or microballons should be employed in order to achieve a suitable cellular structure.

Although not necessary, for some applications it is desirable that the initial foam contain a suitable quantity of a flame retardant material in order to still further increase the flame resistance of the foam.

In preparing the polyimide precursors, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers As a general rule temperatures ranging from 200° to 400 C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 MHz, with the power output ranging from 1 to 100 kw. The power output to prepolymer weight ratio generally falls within the range of 0.1 to 10 kw per kg.

The specific details concerning the production of polyimide foams have been extensively described in the literature and foams suitable for use in the practice of this invention are available as articles of commerce (SOLIMIDE Foam). In practicing this invention, all that is required is that the initial cured polyimide foam be convertible to a non-flexible, non-resilient recurable material when subjected to steam treatment under appropriate conditions of time, temperature and pressure.

The flame and fire resistance of the cured articles of this invention together with their relatively low smoke output when exposed to fire render them ideally suited for use as decorative, construction and/or insulation materials for aircraft and spacecraft, houses and buildings of all types, automobiles an trucks, boats and ships, submarines, furniture and the like. The laminated and coated structures are particularly useful as structural members especially when the laminate(s) and/or substrates are themselves composed of flame resistant or non-combustible material(s). Such articles can readily be applied to or used as flame resistant panels for wall and ceiling surfaces, and can serve to dampen sound and other types of vibration. Enhancing all such utilities are the relatively high strengths and variety of densities in which the articles of this invention may be provided. The particulate recurable material may be compressed and cured either in molds or through extrusion dies to produce any of a variety of molded articles, such as knobs, handles, plates, rods, and the like.

It will be apparent that this invention is susceptible to considerable variation in the practice without departing from the spirit and scope of the appended claims, the forms described hereinbefore being merely exemplary of its practice.

What is claimed is:

1. A process which comprises compressing and heat curing the coating or lamination on a coated or laminated substrate wherein the coating or lamination is a non-resilient, non-flexible recurable material formed by subjecting cured polyimide foam to the action of pressurized steam.

2. A process of claim 1 wherein said recurable material is in subdivided or particulate form before it is compressed.

3. A process of claim 1 wherein said recurable material is in cellular form before it is compressed.

4. A process of claim 1 wherein said recurable material is in subdivided or particulate form and is in admixture with a subdivided or particulate filler before it is compressed.

5. A process of claim 1 wherein the compressing and heat curing are conducted sequentially.

6. A process of claim 1 wherein the compressing and heat curing are conducted concurrently.

7. A process of claim 1 wherein the compressing and heat curing are conducted sequentially and wherein said recurable material is in subdivided or particulate form before it is compressed.

8. A process of claim 1 wherein the compressing and heat curing are conducted sequentially and wherein said recurable material is in subdivided or particulate form and is in admixture with a subdivided or particulate filler before it is compressed.

9. A process of claim 1 wherein the compressing and heat curing are conducted concurrently and wherein said recurable material is in subdivided or particulate form before it is compressed.

10. A process of claim 1 wherein the compressing and heat curing are conducted concurrently and wherein said recurable material is in subdivided or particulate form and is in admixture with a subdivided or particulate filler before it is compressed.

11. A process of claim 1 wherein the cured polyimide foam from which the recurable material was formed was a polyimide of (a) at least one aromatic tetracarboxylic acid or derivative thereof and (b) at least one aromatic or heterocyclic primary diamine, or combination thereof.

12. A process of claim 1 wherein the cured polyimide foam from which the recurable material was formed was a polyimide formed from a polyimide precursor composed predominantly of 3,3',4,4'-benzophenone tetracarboxylic acid lower alkyl ester, 4,4'-methylenedianiline and a diaminopyridine.

13. A process of claim 1 conducted such that the compressed and cured coating or lamination on the substrate is a cellular reinforced or filled coating or lamination of cured polyimide.

14. A process of claim 1 conducted such that the compressed and cured coating or lamination on the substrate is a cellular unreinforced, unfilled coating or lamination of cured polyimide.

15. A process of claim 1 conducted such that the compressed and cured coating or lamination on the substrate is a non-cellular reinforced or filled coating or lamination of cured polyimide.

16. A process of claim 1 conducted such that the compressed and cured coating or lamination on the substrate is a non-cellular unreinforced, unfilled coating or lamination of cured polyimide.

17. A process which comprises (i) subjecting cured polyimide foam to the action of pressurized steam to form a non-resilient, non-flexible recurable material, (ii) applying the non-resilient, non-flexible recurable material to a substrate to form a coated or laminated substrate, and (iii) compressing and heat curing the recurable material on such coated or laminated substrate.

18. A process of claim 17 further comprising subdividing the cured polyimide foam before subjecting the foam to the action of pressurized steam.

19. A process of claim 17 further comprising subdividing the recurable material before applying such material to the substrate.

20. A process of claim 17 wherein the compressing and heat curing are conducted sequentially.

21. A process of claim 17 wherein the compressing and heat curing are conducted concurrently.

22. A process of claim 17 further comprising subdividing the cured polyimide foam before subjecting the foam to the action of pressurized steam, and conducting the compressing and heat curing sequentially.

23. A process of claim 17 further comprising subdividing the cured polyimide foam before subjecting the foam to the action of pressurized steam, and conducting the compressing and heat curing concurrently.

24. A process of claim 17 further comprising subdividing the cured polyimide foam before subjecting the foam to the action of pressurized steam, admixing subdivided or particulate filler with the subdivided cured polyimide foam, and conducting the compressing and heat curing sequentially.

25. A process of claim 17 further comprising subdividing the cured polyimide foam before subjecting the foam to the action of pressurized steam, admixing subdivided or particulate filler with the subdivided cured polyimide foam, and conducting the compressing and heat curing concurrently.

26. A process of claim 17 further comprising subdividing the recurable material before applying such material to the substrate, and conducting the compressing and heat curing sequentially.

27. A process of claim 17 further comprising subdividing the recurable material before applying such material to the substrate, and conducting the compressing and heat curing concurrently.

28. A process of claim 17 further comprising subdividing the recurable material before applying such material to the substrate, admixing subdivided or particulate filler with the subdivided recurable material, and conducting the compressing and heat curing sequentially.

29. A process of claim 17 further comprising subdividing the recurable material before applying such material to the substrate, admixing subdivided or particulate filler with the subdivided recurable material, and conducting the compressing and heat curing concurrently.

30. A process of claim 17 wherein the cured polyimide foam from which the recurable material was formed was a polyimide of (a) at least one aromatic tetracarboxylic acid or derivative thereof and (b) at least one aromatic or heterocyclic primary diamine, or combination thereof.

31. A process of claim 17 wherein the cured polyimide foam from which the recurable material was formed was a polyimide composed predominantly of 3,3',4,4'-benzophenone tetracarboxylic acid, 4,4'-methylenedianiline and a diamino- pyridine.

32. A process of claim 17 conducted such that the compressed and cured coating or lamination on the substrate is a cellular reinforced or filled coating or lamination of cured polyimide.

33. A process of claim 17 conducted such that the compressed and cured coating or lamination on the substrate is a cellular unreinforced, unfilled coating or lamination of cured polyimide.

34. A process of claim 17 conducted such that the compressed and cured coating or lamination on the substrate is a non-cellular reinforced or filled coating or lamination of cured polyimide.

35. A process of claim 17 conducted such that the compressed and cured coating or lamination on the substrate is a non-cellular unreinforced, unfilled coating or lamination of cured polyimide.

* * * * *